Oct. 19, 1965  W. A. HENSLEY, JR  3,212,600
SEISMIC EXPLORATION OF WATER COVERED AREAS
Filed Dec. 28, 1961
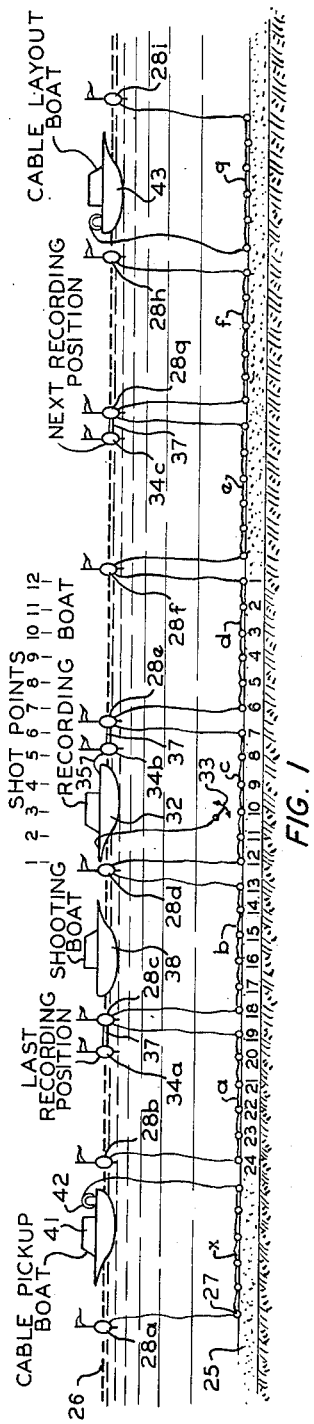
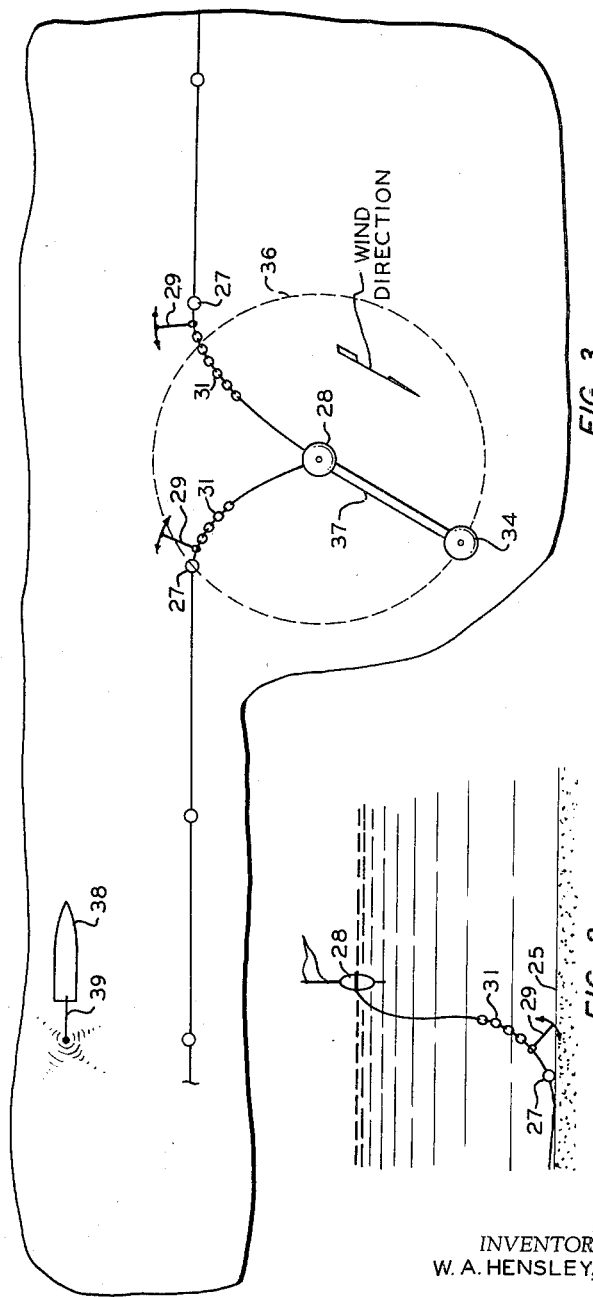
INVENTOR.
W. A. HENSLEY, JR.
BY *Young & Quigg*
ATTORNEYS

United States Patent Office 3,212,600
Patented Oct. 19, 1965

3,212,600
SEISMIC EXPLORATION OF WATER
COVERED AREAS
William A. Hensley, Jr., Bartlesville, Okla., assignor to
Phillips Petroleum Company, a corporation of Delaware
Filed Dec. 28, 1961, Ser. No. 162,681
4 Claims. (Cl. 181—.5)

This invention relates to the seismic exploration of water-covered areas. More particularly, it relates to a method and apparatus for arranging, coupling, maneuvering, and operating seismic cable and seismometers in the exploration of water-covered areas.

In recent years, a great deal of interest and activity has developed in the search for oil and gas in water-covered areas, such as the Gulf of Mexico. Two general techniques of seismic exploration have been used in such marine areas: the "drag cable bottom method" and the "floating cable method." In the former method, a plurality of spaced seismometers electrically connected to a seismic cable are placed at known locations in a spread on the marine floor and after each shot the spread is dragged or towed to the next setup or point of recording. In the floating cable method, a spread of seismometers are supported by floats at or near the surface of the water and after each shot the spread is towed to the next setup. Although these prior art methods of marine seismic exploration have enjoyed some success, they are not without their difficulties. The dragging of a seismometer cable along the marine floor is time-consuming and requires the use of heavy and rugged seismic cable and seismometers, which necessarily limits the extent of the spread and the presence of sunken ships and other irregularities or obstacles on the marine floor present hazards such as the fouling of seismic equipment. Where the seismometer spread is supported by floats at or near the surface of the water, the vagaries of wind and current result in the picking up of a great deal of noise and displacement of the spread from the desired prospect line. Also, in the towing of such a float-supported spread to the next setup, there is the ever-present danger that the spread will hinder other water-borne traffic or be fouled by submerged objects. The high cost in seismic exploration of water-covered areas has given rise to the need for an improved method and means to reduce the expense, time and effort expanded in carrying out such exploration, and to improve the results obtained.

Accordingly, an object of this invention is to improve the seismic exploration of water-covered areas. Another object is to provide an improved method and apparatus for arranging, coupling, maneuvering and operating seismic cable and seismometers in the exploration of water-covered areas. Another object is to provide an improved method and apparatus for carrying out such marine seismic exploration whereby the expense, time and labor of such exploration is reduced and the results obtained are improved. Another object is to increase the number of shots that can be detonated and recorded during one marine seismic setup in the making of a continuous profile of subsurface geological formations in marine areas. Other objects and advantages of this invention will become apparent from the following discussion, appended claims and accompanying drawing in which:

FIGURE 1 is a sectional view of a water-covered area illustrating one embodiment of this invention;
FIGURE 2 is a sectional view showing certain details of FIGURE 1; and
FIGURE 3 is a plan view showing certain other details of FIGURE 1.

According to this invention, a plurality of spaced seismometers are electrically connected to seismic cable and positioned along a prospect line on the marine floor of a water-covered area to form a seismometer setup. Seismic disturbances are successively generated at a plurality of shotpoints along the seismometer setup and the resulting seismic reflection events are detected by a common number of seismometers (arranged in a seismometer spread) and recorded. The seismometer spread is advanced along the prospect line during each setup after each of said disturbances by simultaneously deenergizing or removing from the seismic recording circuitry one or more of the trailing seismometers of the spread and energizing or placing in the recording circuitry one or more seismometers positioned along said prospect line in advance of said spread. As the exploration progresses along the prospect line and a plurality of reflection events from a plurality of common points in the subsurface geological formations are detected and recorded (by the so-called "common reflection point" technique), a section of seismometer cable together with its coupled seismometers is decoupled from the trailing end of the seismometer setup when such cable is no longer needed in detecting and recording seismic events at a common number of points along the marine floor. The decoupled cable is moved to a position along the prospect line in advance of the setup and it is placed along the marine floor. After the last shot in the setup has been detonated and the resulting seismic events detected and recorded, the advanced section of seismic cable is coupled to the leading end of the last seismometer spread used in the previous setup. Thereafter, the recording boat is moved to the recording position of the next setup and the operation repeated to obtain a continuous profile of subsurface geological formations by the common reflection point technique.

Further understanding of this invention will be gained by reference now to the accompanying drawing and the following description thereof. In FIGURE 1, a plurality of common section cables a, b, c, d, e, f, g and x are illustrated placed along a prospect line on the marine floor 25 beneath a body of water having a surface 26. Cables a through f comprise those cables used in one seismometer setup. Cable x is a cable used in a previous setup, and cable g is a cable used in a subsequent cable (or it can be cable x transported to the advanced position adjacent the leading end of cable f).

Each common section cable comprises a water-tight casing having a plurality of insulated pairs of conductors covered by an extruded insulating sheet, one such pair of conductors being provided for each seismometer station and adapted to convey seismic signals. The seismometers used are preferably pressure detectors, such as Pressure Detector Model EVP-5, made by Electro-Technical Labs. Each pair of conductors is connected to a seismometer station, which can comprise a single seismometer, or a plurality or "patch" of seismometers arranged in series or in parallel, or in combinations thereof. A plurality of seismometer stations spaced equal distance one from the other, are so connected to the common section cable, these seismometer stations being shown in the drawing as small circles, each of the common section cables preferably having six such seismometer stations as shown in the drawing. The two extremities of each common section cable extending to the surface 26 of the body of water are connected to buoys 28. The adjacent seismometer stations of two adjacent common section cables are spaced the same distance apart (e.g., 500 feet) as are each of the adjacent seismometer stations in a common section cable. Secured to the two extremities of that portion of the common section cable placed on the marine floor 25 are anchors 29, shown in detail in FIGURE 2. Such anchors are adapted to restrain the cable buoys 28 in their positions. Preferably, there is secured to the lower end of each ascending portion of the common section cable a length (e.g., 4 feet) of chain or similar weight 31 to supplement the function of anchor 29 and to minimize detection of noise by that seismometer station 27 adjacent the anchor.

In each seismic setup, a common number of common section cables, e.g., 6 (and common number of seismometer stations, e.g., 36) are used in detecting and recording seismic events occasioned by seismic disturbances generated at a plurality of equally-spaced shotpoints in each setup. As shown in FIGURE 1, seismometer cables $a$, $b$, $c$, $d$, $e$ and $f$ are coupled together along the prospect line at the loci of buoys 28. This coupling can be effected by connecting the conductors at one end of each common section cable to a multi-terminal male plug attached to the buoy 28 and connecting the conductors at the other end of the common section cable to a multi-terminal female plug also attached to an adjacent buoy 28. Such mating plugs provide a means for coupling together in a predetermined fashion a plurality of such section cables, so as to form a composite seismometer cable having conductors running the length thereof. A first plurality of such common section cables extend from one side of the shotpoint, and a second plurality of such common section cables extend in an opposite direction on one side of said shotpoint. In the arrangement illustrated in FIGURE 1, I have shown the position of the first shotpoint adjacent the trailing seismometer station of common section cable $c$, this seismometer being numbered 12. Extending to the left of shotpoint 1, I have designated the seismometer stations as numbering 13 through 24. To the right of shotpoint 1, I have designated the seismometer stations as numbering 1 through 11. Seismometer stations 1–24 of common section cables $a$, $b$, $c$ and $d$ comprise the seismometer spread used in making recordings of the first shot at shotpoint 1. In making recordings of the shot generated at shotpoint 12, the seismometer spread (again consisting of 24 seismometer stations) will consist of common section cables $c$, $d$, $e$ and $f$.

A recording boat 32 is secured in its recording position by means of anchor 33. This boat 32 is so positioned such that it can record the reflection seismic events occasioned by shots generated at a plurality of shot-points in the setup, e.g., shotpoints 1–12 of FIGURE 1. Cable means 35 are provided in recording boat 32 for transmitting the detected signals to amplifying-recording equipment carried on boat 32. Such equipment includes a gang switch or the like, preferably one for each of the two seismometer cables used in the spread, the manipulation of such a switch allowing the operator to switch out of the amplifying-recording circuitry those seismometer stations in the seismic setup which are not used for a particular shotpoint, and switch into the circuitry those stations in the setup which are used for the particular shotpoint.

Adjacent the recording position in each setup, there is preferably located a plug buoy 34. A "floating jumper" 37 is attached between the plug buoy 34 and the adjacent cable buoy 28. This floating jumper functions to permit the transmission of the detected signals from the common section cables to the amplifying-recording equipment carried by the recording boat 32 when the cable 35 carried by boat 32 is coupled to the plugs carried by the plug buoy 34. The arrangement of the plug buoy with respect to the cable buoy is shown in detail in FIGURE 3. As seen in FIGURE 3, the plug buoy 34 has an area of maneuverability designated by the broken circle 36. This arrangement permits the recording boat 32 to approach the recording position with a greater degree of maneuverability and lessens the chances that the recording boat will foul the seismometer cable attached to buoy 28, the latter having a much smaller degree of maneuverability than plug buoy 34. With the wind direction as shown by the arrow in FIGURE 3, the plug buoy 34 will occupy the position shown. The operator of the recording boat 32, by noting the relative positions of cable buoy 34 and plug buoy 28, can determine this wind direction and so position his boat to avoid fouling of the seismometer cable. Preferably, the recording boat 32 will have on board a smaller boat or skiff which can be set out together with the transmission cable 35 and approach the plug buoy 34 for purposes of coupling the transmission cable to jumper 37.

There is also provided according to this invention a conventional shooting boat 38 which is equipped with suitable instrumentalities for creating seismic disturbances. Such equipment will generally include a long shooting cable 39, shown in FIGURE 3, which is towed through the body of water and is adapted to discharge an explosive at a point in the water remote from the shooting boat and spaced or off-set a predetermined distance from the prospect line along which the seismometer spread is disposed. This shooting boat 38 advances in the direction of the prospect line and successively generates seismic disturbances at each of the shotpoints in each setup.

There is also deployed according to my invention one or more cable boats to pick up common section cables no longer required to complete a seismic setup and transport such cable, without dragging the same along the marine floor or towing the same through the body of water, to a position in advance of the seismeter spread where the so-transported common section cable is placed out along the marine floor. In the arrangement shown in FIGURE 1, cable pickup boat 41 is provided with suitable cable hoisting means 42, such as a seismic cable handler, Model 2AH made by the Sewell Products Company. The pickup boat 41, after decoupling the leading end of section cable from its buoy 28$b$, hauls in the common section cable as the boat moves toward that cable buoy 28$a$ attached to the other end of common section cable $x$. The pickup boat 41, now with common section cable $x$ and its cable buoys 28$a$ on board, can then proceed to a position in advance of the seismometer spread. There, this boat, or another boat 43, can place the so-transported common section cable $x$, or an additional common section cable $g$, preferably by laying out first the leading end of such common section cable and proceeding to a position adjacent the trailing buoy 28$h$ of common section cable $f$. As other trailing cables become unnecessary to complete the spread, they too can be decoupled and transported in advance of the spread. For example, after the shot is fired at shotpoint number 6 and recordings made, cable $a$ can be decoupled and transported in advance of cable $g$, and after the shot at shotpoint 12 is fired and recordings made, cable $b$ can be decoupled, etc. When the last shot in the setup, e.g., the shot generated at shotpoint 12 in FIGURE 1, has been generated and the resulting seismic signals detected and recorded, the operator of boat 43, upon communicating with the recording boat 32, for example by radio, then couples the advanced seismometer cable to the leading end of spread as required to make a complete set up. Thereafter, the recording boat 32 hoists its anchor 33, detaches its transmission cable 35, and moves to the next recording position adjacent cable 28$g$ or plug buoy 34$c$, where the recording boat couples its transmission cable 35 to the floating jumper 37 disposed at this recording position. The shooting boat 38 then, upon communication with recording boat 32, proceeds to generate a new set of seismic disturbances at the new group of shotpoints in the vicinity of the new recording position (i.e., the new setup). At this new recording position, in making the first shot adjacent the locus of buoy 28$f$, seismometer cables $c$, $d$, $e$ and $f$ (which were used in the previous setup) will be used together with newly placed seismometer cable $g$. The operation is repeated at the new recording position and this is continued until the desired continuous profile is obtained.

Although I have illustrated in the drawing and described the generation and recording of twelve shots in each setup, it is within the scope of this invention to generate and record a lesser number of shots at more widely but uniformly-spaced locations.

The advantages of the subject invention should become readily apparent from the foregoing discussion. By its operation, this invention enables one to make a plurality of shots at each setup without manipulating or moving any seismometers or any cable during the steps carried out in making recordings in the setup. No seismometer cable or seismometers are dragged along the marine floor or through the water. As such, heavy duty or rugged cable and seismometers are not required, thereby permitting the seismometer spread to extend over a large area, e.g., two miles. The floating jumper feature and anchoring feature of the invention permit the recording boat to approach its recording position without danger of fouling seismometer cable and the seismometer setup cannot be displaced from its prospect line by wind and current. This invention thus provides an improved method and means which makes the seismic exploration expeditious and economical.

Various modifications and alterations of this invention will become apparent to those skilled in the art from the foregoing discussion without departing from the scope and spirit of this invention; and, it should be understood that this invention is not to be limited unduly to those preferred embodiments set forth herein for illustrative purposes.

I claim:
1. A seismic profiling method for conducting reflection seismic exploration over water-covered areas, comprising the steps of establishing a plurality of common section seismometer cables along a prospect line positioned on the floor of said water-covered areas, said plurality of cables constituting a set-up; connecting a common number of uniformly spaced seismometer stations at predetermined points along said cables; maintaining the extremities of each of said plurality of cables at the surface of the said body of water; coupling the extremities of adjacent cables together, thereby forming a seismometer spread with the total number of cables in such a spread being constant and less than the number of said cables in said set-up, said spread successively extending the same distance on both sides of each of a plurality of shot points located along said prospect line; successively generating seismic disturbances in said body of water at said shot points uniformly positioned along said prospect line in a first seismometer spread; detecting the resulting seismic reflection signals; recording said detected signals; extending said seismometer stations by transferring one common section seismometer cable from one end of said prospect line to the opposite end; extending said shot points in the direction of movement of said line of seismometer stations, thereby forming a second seismometer spread; successfully initiating seismic impulses at each shot point in said second spread and recording seismic disturbances reflected to each seismometer station in said extended line of seismometer stations.

2. A seismic surveying system for conducting a reflection profile over areas submerged under water comprising a plurality of common section seismometer cables positioned along the surface of the submerged area, said plurality of cables constituting a set-up; a plurality of seismometers placed in electrical communication at predetermined, uniformly spaced points along said plurality of cables; a first plurality of float means connected to the extremities of each of said plurality of common sections for maintaining the said extremities of each of said cables at the surface of said body of water whereby the extremities of adjacent cables are capable of being coupled together to form a seismometer spread with the total number of cables in such a spread being constant and less than the number of cables in said set-up; a second plurality of float means; a plurality of mating plug means mounted on said second plurality of float means; a plurality of jumper cables connecting the extremities of the cables constituting said set-up with said mating plugs located on said second plurality of float means for placing said plurality of cables in each set-up in electrical communication with said second float means; explosive means for generating seismic disturbances in said submerged areas; recording means in electrical communication with said second float means in order to record the seismic disturbance reflected to the plurality of seismometers positioned along said plurality of cables on the surface of the submerged area.

3. Apparatus according to claim 2 including a plurality of anchor means connected to said plurality of common section seismometer cables for anchoring said cables along said submerged area.

4. Apparatus according to claim 3 further including a plurality of chain weights attached to the lower portion of said extremities of said seismometer cables for minimizing detection of noise by the seismometers positioned adjacent the anchor means.

References Cited by the Examiner

UNITED STATES PATENTS

| 2,024,921 | 12/35 | Green | 181—.5 |
|---|---|---|---|
| 2,241,428 | 5/41 | Silverman | 181—.5 |
| 2,449,085 | 9/48 | Peterson | 181—.5 |
| 2,572,255 | 10/51 | Gallaway | 340—7 |
| 2,592,780 | 4/52 | Woods | 181—.5 |
| 2,729,300 | 1/56 | Paslay et al. | 181—.5 |
| 2,798,211 | 7/57 | Smith | 340—7 |
| 3,105,568 | 10/63 | Jolly | 340—15.5 |

SAMUEL FEINBERG, *Primary Examiner.*

CHESTER L. JUSTUS, *Examiner.*